VAPOR PHASE HYDROFLUORINATION OF ALPHA-CHLOROSTYRENE

John A. Sedlak, Stamford, George C. Gleckler, Springdale, and Ken Matsuda, Stamford, Conn., assignors to American Cyanamid Company, Stamford, Conn., a corporation of Maine
No Drawing. Filed Jan. 25, 1963, Ser. No. 254,000
4 Claims. (Cl. 260—651)

This is a continuation-in-part of application Serial No. 188,973, filed April 20, 1962.

This invention relates to a process for preparing $\alpha,\alpha$-difluoroethylbenzene by reacting $\alpha$-chlorostyrene with hydrogen fluoride. More particularly this invention relates to the process for preparing $\alpha,\alpha$-difluoroethylbenzene in a liquid phase or a vapor phase operation.

One of the objects of the present invention is to produce $\alpha,\alpha$-difluoroethylbenzene. A further object of the present invention is to convert $\alpha$-chlorostyrene to $\alpha,\alpha$-difluoroethylbenzene by reacting the former with hydrogen fluoride in a liquid phase or in a vapor phase. These and other objects of the present invention will be discussed in greater detail hereinbelow.

The process for preparing $\alpha,\alpha$-difluoroethylbenzene according to the concept of the present invention may be accomplished by use of either a liquid phase or a vapor phase process. In the liquid phase one will introduce the $\alpha$-chlorostyrene and the hydrogen fluoride into a suitable solvent which is normally liquid at the reaction temperature and by maintaining the reaction temperature between about $-20°$ and $+20°$ C. the $\alpha,\alpha$-difluoroethylbene is produced. It is preferred to use a temperature of about $0°$ C. The organic normally liquid solvents which may be used in the process of the present invention are ethers such as dimethyl ether, diethyl ether, dipropyl ether, tetrahydrofuran and the like or ketones such as acetone, methyl ethyl ketone, cyclohexanone, and other oxygen containing organic solvents. These organic, normally liquid solvents are believed to form a complex with the hydrogen fluoride and by so doing moderate the reactivity of the hydrogen fluoride.

The mol ratio of the hydrogen fluoride to the $\alpha$-chlorostyrene may be varied from about 2:1 to 10:1 respectively. The mol ratio of the solvent to the $\alpha$-chlorostyrene may be varied from about 1:1 to about 6:1 respectively.

In the vapor phase process no solvent is used but instead each of the reactants are heated together at a temperature varying between about $100°$ and $200°$ C. and preferably from about $140°$ to about $160°$ C. In the vapor process it is necessary to make use of a catalyst comprising mercuric oxide deposited on activated charcoal. Reference is made to our parent application having the Serial Number 188,973 filed April 20, 1962, and entitled, "Novel Monomer and Process for Preparing the Same." Our parent application discloses an alternative process for preparing $\alpha,\alpha$-difluoroethylbenzene by a vapor phase process. In said parent application the same catalytic material is used to react phenyl acetylene with hydrogen fluoride as is used in the instant vapor phase process. The catalytic material is comprised of mercuric oxide carried on an activated charcoal base or substrate. This catalytic material is well known in the art and is disclosed in significant detail in the U.S. Patent 2,455,881 which is incorporated herein by reference in order to avoid unnecessary repetition of the knowledge of the prior art. The instant process is generally and preferably carried out in the vapor phase by passing the two reactants diluted with nitrogen into a heat reaction vessel or column containing the mercuric oxide impregnated activated charcoal at the elevated temperatures indicated hereinabove. It is preferred that the $\alpha$-chlorostyrene and the hydrogen fluoride be subjected to a preheating step in order that they may be ready for immediate interreaction upon entry into the reaction vessel. The amount of the mercuric oxide which is deposited on the impregnated activated charcoal will follow conventional amounts and may be varied between about 5% and 25% by weight of mercuric oxide based on the total weight of mercuric oxide and activated charcoal. Preferably the amount of mercuric oxide may be varied between about 12% and 16% by weight, same basis. When a continuous vapor phase technique is used the space velocity of the gases entering into the reaction vessel may be varied between about 200–1000 liters/hr./liter of volume of the catalyst and preferably between about 500 and 700 liters/hour/liter of volume. Generally the $\alpha,\alpha$-difluoroethylbenzene will contain some unreacted hydrogen fluoride and some minor amounts of unreacted $\alpha$-chlorostyrene together with small amounts of impurities. This total mixture should be passed through an aqueous solution of a basic material such as sodium hydroxide, potassium hydroxide, ammonium hydroxide and the like in order to neutralize the hydrogen fluoride by converting the same to the corresponding fluoride salt. This neutralization is best accomplished by bubbling the effluent gases upwardly through the aqueous solution of the basic material. Thereupon the effluent gases emerging from the aqueous basic solution are passed through an inert organic solvent material such as benzene, toluene, xylene, ethylbenzene, mineral spirits and the like. This organic solvent solution is distilled so as to produce the $\alpha,\alpha$-difluoroethylbenzene.

If the percentage of $\alpha,\alpha$-difluoroethylbenzene in the ultimate reaction product of the first step is satisfactorily high and the amount of organic impurities is comparatively low, no fractional distillation step need be entertained. On the other hand, if the amount of the organic side reaction products and of unreacted $\alpha$-chlorostyrene is comparatively higher, a fractional distillation step may be considered necessary.

In order that the concept of the present invention may be more competely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with a stainless steel thermowell and stainless steel stirrer there is added 23 parts of anhydrous hydrogen fluoride, cooled to Dry Ice temperature, over a 10 minute period to 44 parts of anhydrous diethyl ether alsow stirred at Dry Ice-acetone temperature. Some heat is evolved during the addition but the cooling is maintained at about $-75°$ C. The hydrogen fluoride ether solution is then protected from atmospheric moisture and the Dry Ice bath is replaced by an ice-water bath. After the hydrogen fluoride ether solution adjusts to the ice-water bath temperature, 20 parts of the $\alpha$-chlorostyrene is added dropwise over a 1 hour period with vigorous stirring. The stirring is continued for another hour following the addition of the $\alpha$-chlorostyrene while maintaining the ice bath temperature. 53 parts of ether are then added and the cold mixture is poured into 200 parts of cracked ice and 100 parts of water contained in a stainless steel container. The resultant mixture is cooled and stirred while adding a sufficient amount of 33% (by weight) aqueous potassium hydroxide solution in order to make the aqueous phase basic. The ether layer is then separated and dried over anhydrous magnesium sulfate. The ether is removed by distillation at atmospheric pressure on a steam bath and the residue is distilled at 47 mm. of pressure to give the following fractions:

(1) 4.5 parts, B.P. 67.1° C.
(2) 1.6 parts, B.P. 67.1–105° C.
(3) 1.5 parts, B.P. 105° C.+

The gas liquid chromatographic analysis showed that fraction 1 was substantially pure $\alpha,\alpha$-difluoroethylbenzene, fraction 2 was 80% $\alpha,\alpha$-difluoroethylbenzene while fraction 3 was predominantly acetophenone. The yield of $\alpha,\alpha$-difluoroethylbenzene was 5.8 parts or 28% yield based on the amount of $\alpha$-chlorostyrene used. The $\alpha,\alpha$-difluoroethylbenzene is characterized by its infrared spectrum which showed absorption at 1388 cm.$^{-1}$ for —$CH_3$ and 1182 cm.$^{-1}$ for —$CF_2$—. The analysis is set forth hereinbelow:

Calculated for $C_8H_8F_2$: C, 67.61; H, 5.67; F, 26.74. Found: C, 67.94; H, 5.70; F, 27.08.

*Example 2*

A reaction tube containing mercuric oxide impregnated on granular (4 mesh size) activated charcoal is swept with dry nitrogen and then with anhydrous hydrogen fluoride. The entire length of the reaction tube is jacketed with an electric furnace segmented for separate heating of top, center and bottom. The top of the reactor is equipped with a preheater having separate entrance ports for liquid $\alpha$-chlorostyrene and a mixture of gaseous anhydrous hydrogen fluoride and prepurified nitrogen. Provision is made just before the preheater for mixing nitrogen with $\alpha$-chlorostyrene. The temperature of the preheater and the interior temperature of the catalyst bed are measured with thermocouples. The flow rates of nitrogen and liquid $\alpha$-chlorostyrene are measured with rotameters and the flow rate of the hydrogen fluoride gas is measured with a flow meter of a conventional type. The effluent from the end of the reaction tube is passed into the bottom of an ice-cooled scrubber containing 66 parts of n-hexane and 1400 parts of an aqueous solution of 450 parts of potassium hydroxide. The gas from the top of the scrubber is led down through a trap cooled in Dry Ice-acetone and then through a wet-test meter which is connected to a water aspirator regulated to lower slightly the pressure on the outlet side of the reactor so as to maintain the feed side at atmospheric pressure. Before starting the reaction, the system is swept with nitrogen and the preheater temperature is raised to 220° C. while the reactor temperature is raised to about 100° C. The hydrogen fluoride-nitrogen mixture is then turned on at a rate of 0.551 l. (S.T.P)/min. of hydrogen fluoride and 0.157 l. (S.T.P.)/min. of nitrogen. The catalyst temperature rises sharply especially at the top. During the next 25 minutes the furnace is adjusted to bring the top portion of the reactor to 170° C. and the bottom to 160° C. and the catalyst (top) to 155° C. The $\alpha$-chlorostyrene-nitrogen mixture is then turned on at a rate of 0.00686 mol/min. of $\alpha$-chlorostyrene and 0.153 l. (S.T.P.)/min. of nitrogen. The space velocity is 611 liters of gas (S.T.P.)/liter of catalyst/hr. These temperatures and flow rates are maintained for 150 minutes thereupon the $\alpha$-chlorostyrene and hydrogen fluoride are shut off. The total amounts of reactants fed were 1.03 mols of $\alpha$-chlorostyrene and 3.69 mols of hydrogen fluoride. The total nitrogen feed is 2.08 mols, 46.5 l. (S.T.P.); the off-gases measured by the weight test meter were 44.3 l. (S.T.P.). After sweeping the system with nitrogen for a half hour, the scrubber and cold trap were dismantled and the contents combined. The organic layer was separated, washed three times with a saturated aqueous potassium chloride solution made slightly basic with ammonium hydroxide and then dried over anhydrous magnesium sulfate. The resultant dried product is then distilled. The distillate consisted of 61.9 parts of $\alpha$-chlorostyrene and 9.2 parts of $\alpha,\alpha$-difluoroethylbenzene, in addition to the recovered hexane solvent.

It has been indicated hereinabove that nitrogen or any other inert gas may be used as a diluent in the vapor phase reaction. The amount of diluent used is in no way critical but for favorable operating results and best yields it is desired to use a mol ratio of inert gas to $\alpha$-chlorostyrene varying between about 1:1 and 3:1. It should be observed that in the preceding example the nitrogen to $\alpha$-chlorostyrene mol ratio is about 2:1.

We claim:

1. A process for preparing $\alpha,\alpha$-difluoroethylbenzene comprising heating at a temperature between about 100° and 200° C. in the vapor phase $\alpha$-chlorostyrene and hydrogen fluoride while in contact with a catalyst comprising mercuric oxide on activated charcoal, wherein the mol ratio of hydrogen fluoride to $\alpha$-chlorostyrene is between about 2:1 and 8:1, respectively.

2. A process for preparing $\alpha,\alpha$-difluoroethylbenzene comprising heating at a temperature between about 140° and 160° C. in the vapor phase $\alpha$-chlorostyrene and hydrogen fluoride while in contact with a catalyst comprising mercuric oxide on activated charcoal, wherein the mol ratio of hydrogen fluoride to $\alpha$-chlorostyrene is between about 2:1 and 8:1, respectively.

3. A process for preparing $\alpha,\alpha$-difluoroethylbenzene comprising heating at a temperature between about 100° and 200° C. in the vapor phase $\alpha$-chlorostyrene and hydrogen fluoride while in contact with a catalyst comprising mercuric oxide on activated charcoal, passing the resultant reaction product through an aqueous solution of a basic material and then into an organic solvent and distilling off the solvent and the resultant $\alpha,\alpha$-difluoroethylbenzene, wherein the mol ratio of hydrogen fluoride to $\alpha$-chlorostyrene is between about 2:1 and 8:1 respectively.

4. A process for preparing $\alpha,\alpha$-difluoroethylbenzene comprising heating at a temperature between about 140° and 160° C. in the vapor phase $\alpha$-chlorostyrene and hydrogen fluoride while in contact with a catalyst comprising mercuric oxide on activated charcoal, passing the resultant reaction product through an aqueous solution of a basic material and then into an organic solvent and distilling off the solvent and the resultant $\alpha,\alpha$-difluoroethylbenzene, wherein the mol ratio of hydrogen fluoride to $\alpha$-chlorostyrene is between about 2:1 and 8:1 respectively.

References Cited by the Examiner

Renoll, "J. Am. Chem. Soc.," vol. 64, pp. 1115–16 (1942).

Henne et al., "J. Am. Chem. Soc.," vol. 65, pp. 1271–2 (1943).

LEON ZITVER, *Primary Examiner.*